(12) United States Patent
Algüera Gallego

(10) Patent No.: US 8,246,079 B2
(45) Date of Patent: Aug. 21, 2012

(54) SUPPORTING TRAVERSE

(75) Inventor: José Manuel Algüera Gallego, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 0 days.

(21) Appl. No.: 12/734,594

(22) PCT Filed: Aug. 25, 2008

(86) PCT No.: PCT/EP2008/061094  
§ 371 (c)(1),  
(2), (4) Date: May 11, 2010

(87) PCT Pub. No.: WO2009/062766  
PCT Pub. Date: May 22, 2009

(65) Prior Publication Data  
US 2010/0253056 A1   Oct. 7, 2010

(30) Foreign Application Priority Data  
Nov. 15, 2007   (DE) .......................... 10 2007 054 613

(51) Int. Cl.  
*B62D 21/00* (2006.01)

(52) U.S. Cl. .......................... 280/781; 280/433; 280/441

(58) Field of Classification Search ................... 280/433, 280/441, 781  
See application file for complete search history.

(56) References Cited

U.S. PATENT DOCUMENTS 5,449,191 A * 9/1995 Cattau ........................ 280/438.1  
5,765,849 A    6/1998 Moulton et al.

FOREIGN PATENT DOCUMENTS

| DE | 103 58 070 A1 | 7/2005 |
| DE | 10 2006 041 664 A1 | 3/2008 |
| EP | 0 694 467 A2 | 1/1996 |
| EP | 1 764 290 A1 | 3/2007 |
| WO | WO 2005/037578 A2 | 4/2005 |

* cited by examiner

*Primary Examiner* — Eric Culbreth  
(74) *Attorney, Agent, or Firm* — Hudak, Shunk & Farine Co. LPA

(57) ABSTRACT

The invention relates to a supporting traverse for reinforcing a vehicle frame, comprising a cross-member with a fastening region, which is integrally formed thereon on the end and can be connected to the vehicle frame, and bearing blocks acting between the fastening regions on the cross-member. The aim of the invention is to refine a supporting strut with which the risk of the bearing block breaking away from the cross-member due to wear is considerably reduced. According to the invention, said aim is achieved by a supporting traverse, wherein the bearing blocks and the cross-member are connected to each other in a non-detachable way.

8 Claims, 4 Drawing Sheets

SUPPORTING TRAVERSE

FIELD OF THE INVENTION

The invention concerns a supporting traverse for reinforcing a vehicle frame, comprising a cross member with a fastening region formed thereon at each end, which can be connected to the vehicle frame, and bearing blocks acting between the fastening regions on the cross member. Furthermore, an arrangement of the supporting traverse on the vehicle frame is protected.

BACKGROUND OF THE INVENTION

Such supporting traverses are constructed in particular on vehicle frames of semitrailer vehicles and carry the bearing blocks on which the fifth wheel rests. Due to the swivel mounting of the fifth wheel, it can perform a tilting movement about a horizontal pivot axis relative to the bearing blocks fastened to the tractor vehicle in stationary manner. The forces occurring when driving are conducted via the fifth wheel, the bearing blocks and the cross member into the vehicle frame of the tractor vehicle.

A supporting traverse of this kind is known from EP 1 764 290 A1. The fifth wheel described therein comprises one coupling plate and at least two bearing blocks, which are fastened in detachable manner on a cross member of the supporting traverse. The detachable fastening, however, has the drawback that settling can occur between the bearing blocks and the cross member, which becomes greater as the loading continues. In extreme driving situations, it can ultimately result in the bearing blocks being ripped off of the cross member.

For this reason, the basic problem of the invention is to further develop a supporting strut for which the risk of a wear-induced ripping of the bearing block from the cross member is distinctly reduced.

SUMMARY OF THE INVENTION

The problem is solved according to the invention with a supporting traverse in which the bearing blocks and the cross member are joined together in an undetachable manner.

By an undetachable connection is meant primarily a fabrication of bearing blocks and cross member as a single cast piece. Therefore, the cross member and the bearing blocks have a homogeneous structure. Furthermore, the fabrication as a cast piece has the advantage of especially low production costs.

Alternatively to the above-described embodiment, the bearing blocks can also be fastened by means of a rivet connection to the cross member. It is likewise possible to weld the bearing blocks to the cross member and thereby produce a cohesive and single-piece connection.

Preferably, at least one end stop is formed on the cross member and/or the bearing blocks, which limits the angle of tilting of a fifth wheel supported on the bearing blocks. The end stop effectively prevents a collision of the fifth wheel with the vehicle frame. The end stop also should be formed undetachably, such as a cast lug, on at least one bearing block or the cross member.

Advantageously, the cross member is an open or closed section, which achieves an especially torsion-proof structure. By an open section is meant especially a C-section or double T-section. Closed sections are, for example, rectangular or round sections.

It has proven to be beneficial if the fastening regions are flange plates oriented perpendicular to the axial dimension of the cross member. The flange plates should close off the cross member at the ends, which accomplishes an especially effective protection against corrosion, particularly for cross members fashioned as a hollow section. The configuration of the flange plate also enables a good connection to the frame.

Advisedly, the bearing blocks act on the cross member at its top side. As a result, the cross member has a constant width and can be installed without adjustments in the overwhelming majority of vehicle frames without structural adjustments.

The problem is also solved by an arrangement of a supporting traverse between two stringers of a vehicle frame, wherein the stringers have boreholes set off from each other in the longitudinal axis of the vehicle, enabling a fastening of the supporting traverse in different positions. This yields the benefit that the spacing between the fifth wheel and the driver's cabin and thus the gap between the front end of the semitrailer and the driver's cabin is adjustable. Furthermore, one can influence the axle load by the choice of the installation position in the driving direction.

BRIEF DESCRIPTION OF THE DRAWINGS

For a better understanding, the invention will be explained more closely by means of four figures. There are shown.

DETAILED DESCRIPTION OF THE INVENTION

Figure 1:
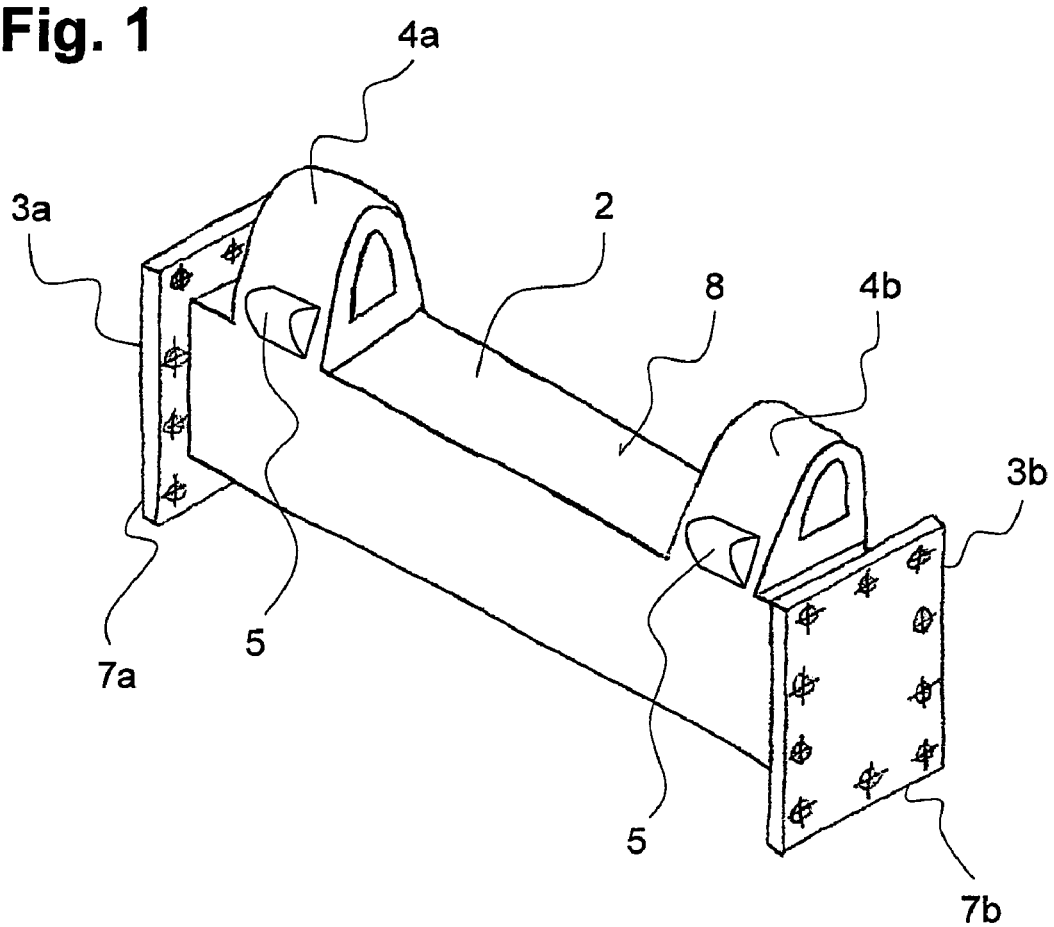
FIG. 1: a perspective front view of a supporting traverse.
Figure 3:
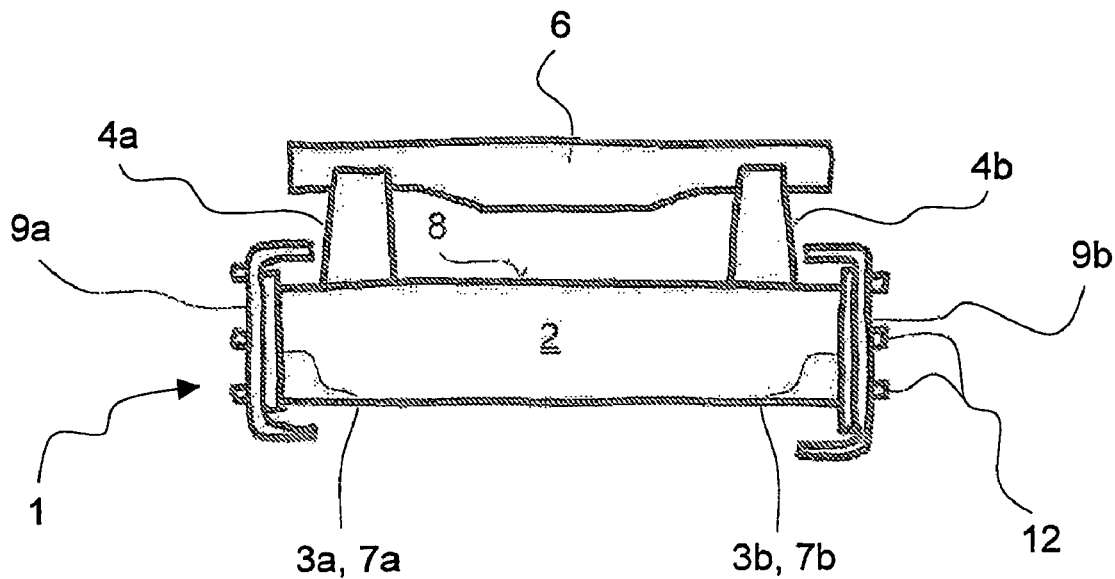
FIG. 3: a front view of a supporting traverse with fifth wheel coupling plate attached to it in the installed state.
Figure 4:
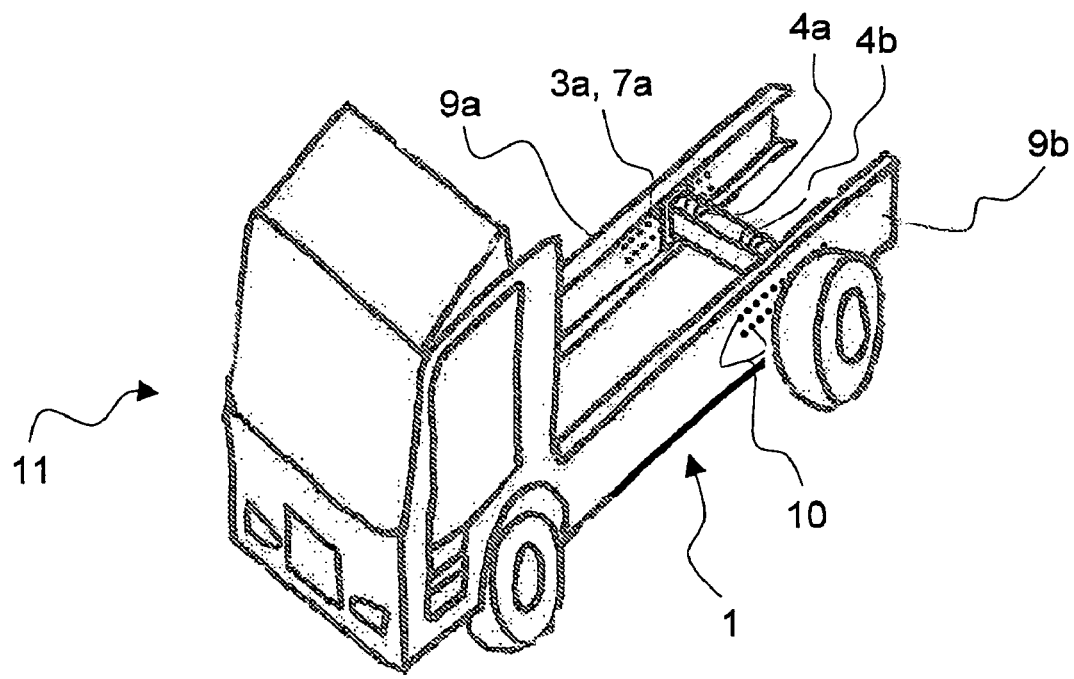
FIG. 4: a perspective top view of a supporting traverse mounted in a tractor vehicle.

FIG. 1 shows the supporting traverse of the invention in a perspective front view with a cross member 2 fashioned as a rectangular section, having fastening regions 3a, 3b at the ends for mounting on a vehicle frame 1 (see FIGS. 3 and 4). Each fastening region 3a, 3b is formed from a rectangular flange plate 7a, 7b, in which boreholes not otherwise designated are introduced for mounting on the vehicle frame 1. The flange plate 7a, 7b is oriented at right angles to the axial dimension of the cross member 2 and joined to it as a single piece.

One notices two bearing blocks 4a, 4b spaced apart from each other on only the top side 8 of the cross member 2. Each bearing block 4a, 4b has a convex shape and acts only on the top side 8 of the cross member 2. Furthermore, an end stop 5 projects from the peripheral wall of the bearing blocks 4a, 4b, likewise being joined to the respective bearing block 4a, 4b as a single piece. On the opposite, back side of the bearing blocks 4a, 4b there can likewise be provided a correspondingly shaped end stop 5 (not shown). The end stops 5 limit the angle of tilt of the fifth wheel 6 (see FIG. 2) about its horizontal swivel axis, oriented perpendicular to the direction of travel.

Figure 2:
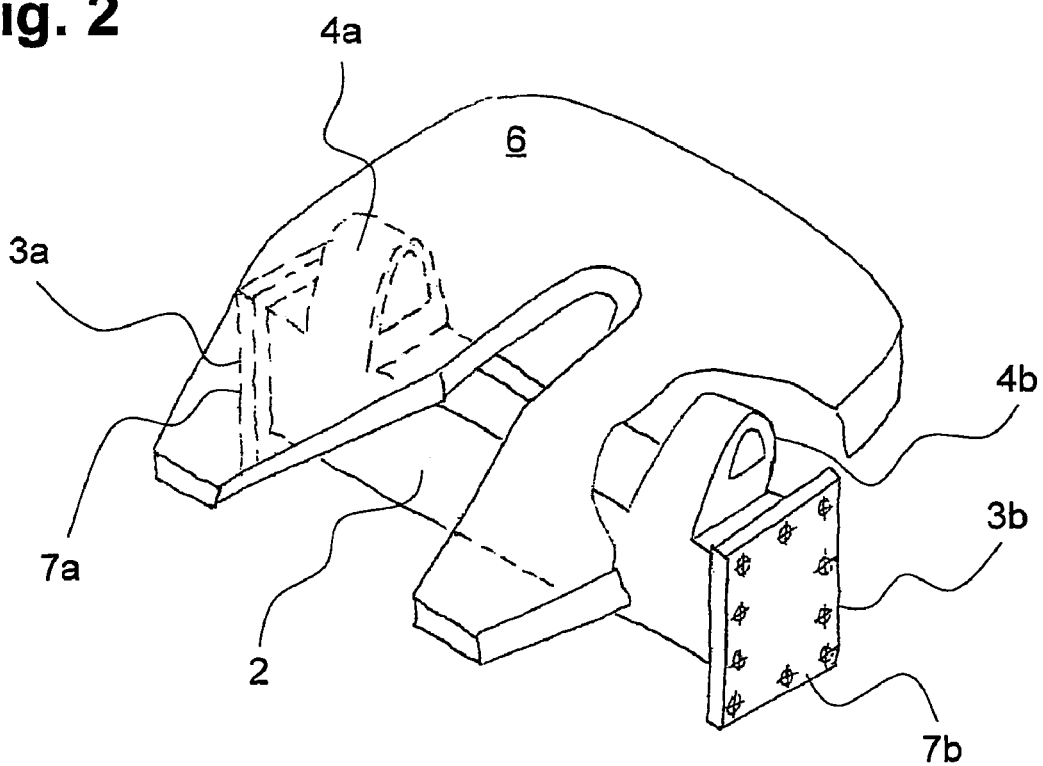
FIG. 2: a perspective rear view of a supporting traverse with fifth wheel coupling plate attached to it.

In FIG. 2 the supporting traverse is shown with a fifth wheel 6 located thereon in a perspective rear view. To achieve the most stable possible mounting of the fifth wheel 6 transversely to the direction of travel, the bearing blocks 4a, 4b are located as far to the outside as possible, underneath the edge region of the fifth wheel. Thus, the bearing blocks 4a, 4b are located essentially in spatial proximity to the flange plates 7a, 7b.

FIG. 3 shows a front view of the supporting traverse in the installed state between stringers 9a, 9b of a vehicle frame 1. One notices that the cross member 2 reaches into the U-section of the stringers 9a, 9b. In this installed position, an extremely small structural spacing exists between the upper horizontally oriented legs of the stringers 9a, 9b and the respective bearing block 4a, 4b.

Figure 5:
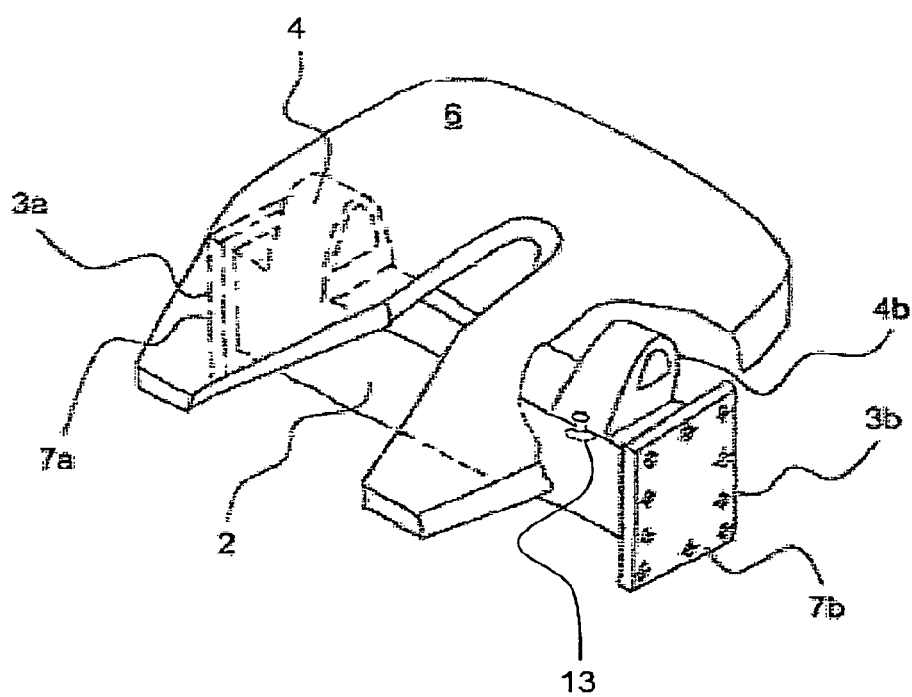
FIG. 5 is a perspective rear schematic view of a supporting traverse with fifth wheel coupling plate attached to it, wherein the bearing blocks are fastened by a rivet to the cross member.
Figure 6:
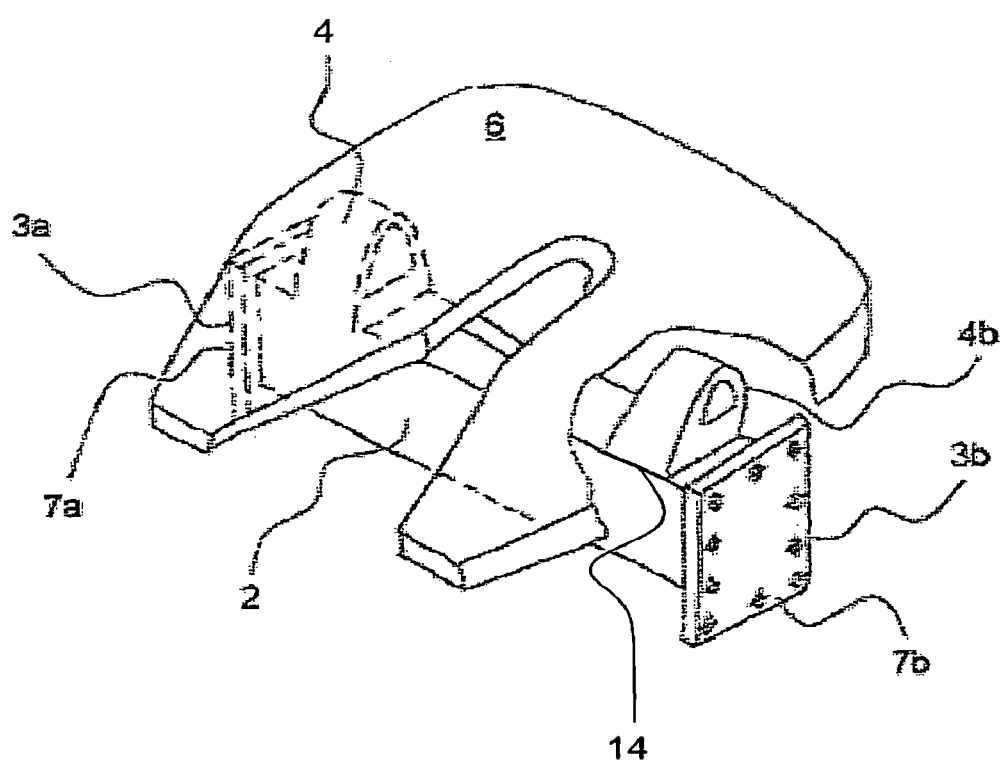
FIG. 6 is a perspective rear schematic view of a supporting traverse with fifth wheel coupling plate attached to it, wherein the bearing blocks are fastened by means of welded connection to the cross member.

In FIG. 4, the installed position of the supporting traverse in a tractor vehicle 11 is especially well seen. The supporting traverse in the mounted state is located approximately in the region of the rear axle, but it can also be installed in other positions, set off in the longitudinal axis of the vehicle, by its fastening regions 3a, 3b, of which only fastening region 3a is apparent, and the boreholes 10 arranged in the stringers 9a, 9b. The fastening screws 12 extend through the boreholes 10 (see FIG. 3). FIG. 5 is a view similar to FIG. 2 that schematically illustrates the bearing blocks 4 fastened by a rivet 13 to the cross member 2. FIG. 6 is a view similar to FIG. 2 that schematically illustrates the bearing blocks 4 fastened by a weld connection 14 to the cross member 2.

List of reference numbers 1 vehicle frame
2 cross member
3a, b fastening region
4a, b bearing block
5 end stop
6 fifth wheel
7a, b flange plate
8 top side of cross member
9a, b stringers of vehicle frame
10 borehole
11 tractor
12 fastening screws
13 rivet
14 weld connection

What is claimed is:

1. A supporting traverse for reinforcing a vehicle frame, comprising:

a cross member with a fastening region at each end and fashioned as a hollow section, which is connected to the vehicle frame and bearing blocks located between the fastening regions on the cross member, wherein the bearing blocks and cross member are fabricated as a single cast piece or the bearing blocks are fastened by means of a rivet or welded connection to the cross member, wherein the cross member is provided with a closed profile, and wherein the fastening regions are flange plates oriented perpendicular to an axial dimension of the cross member closing off the hollow cross member at the ends.

2. The supporting traverse According to claim 1, wherein at least one end stop is formed On one or more of the cross member and the bearing blocks, which limits the angle of tilting of a fifth wheel supported on the bearing blocks.

3. The supporting traverse according to claim 2, wherein the bearing blocks act on the cross member exclusively at its top side.

4. The supporting traverse according to claim 2, wherein the cross member is a rectangular section.

5. The supporting traverse according to claim 4, wherein the bearing blocks act on the cross member exclusively at its top side.

6. The supporting traverse according to claim 1, wherein the cross member a rectangular section.

7. The supporting traverse according to claim 1, wherein the bearing blocks act on the cross member exclusively at its top side.

8. An arrangement of a supporting traverse according to claim 1 between two stringers of a vehicle frame, wherein the stringers have boreholes set off from each other in the longitudinal axis of the vehicle, enabling a fastening of the supporting traverse in different positions.

* * * * *